(12) United States Patent
Su

(10) Patent No.: US 11,794,520 B2
(45) Date of Patent: Oct. 24, 2023

(54) CONDUCTIVE CASTER WHEEL

(71) Applicant: Chung-Hsiu Su, Kaohsiung (TW)

(72) Inventor: Chung-Hsiu Su, Kaohsiung (TW)

(*) Notice: Subject to any disclaimer, the term of this patent is extended or adjusted under 35 U.S.C. 154(b) by 0 days.

(21) Appl. No.: 17/558,044

(22) Filed: Dec. 21, 2021

(65) Prior Publication Data

US 2022/0203764 A1    Jun. 30, 2022

(30) Foreign Application Priority Data

Dec. 29, 2020   (TW) .................................. 109146702

(51) Int. Cl.
   *B60B 33/00*   (2006.01)

(52) U.S. Cl.
   CPC ...... *B60B 33/0028* (2013.01); *B60B 33/0039* (2013.01); *B60B 33/0049* (2013.01); *B60B 2900/921* (2013.01)

(58) Field of Classification Search
   CPC . Y10T 16/184; Y10T 16/212; Y10T 16/1857; Y10T 16/186; Y10T 16/1867; Y10T 16/196; B60B 33/002; B60B 33/00; B60B 33/0028; B60B 33/0036; B60B 33/0039; B60B 33/0047; B60B 33/0057; B60B 33/045; B60B 33/0049; B60B 33/0063; B60B 9/06; B60B 9/005; B60B 2900/1331; B60B 33/0002; B60B 33/0068; B60B 33/0073; B60B 33/0081; B60B 2200/20; B60B 2360/00; B60B 2380/12; B60B 2900/571; B60B 2900/572; B60B 2900/921; B60G 11/00; B60G 11/14; B60G 11/15; B60G 11/16; B60G 11/006; B60G 3/01; A45C 5/14; A45C 2005/148

See application file for complete search history.

(56) References Cited

U.S. PATENT DOCUMENTS

| | | | | |
|---|---|---|---|---|
| 1,797,545 | A | * | 3/1931 | Churcher ................ B60C 19/08 310/90 |
| 2,267,503 | A | * | 12/1941 | Lytle ...................... B60C 19/08 152/DIG. 2 |
| 2,686,891 | A | * | 8/1954 | Burgin .................... B60R 16/06 191/1 R |

(Continued)

FOREIGN PATENT DOCUMENTS

| | | | | |
|---|---|---|---|---|
| CH | 643189 A | * | 5/1984 | ......... B60B 33/0028 |
| DE | 29503488 U1 | * | 7/1996 | ............. B60B 33/00 |

(Continued)

*Primary Examiner* — Chuck Y Mah

(74) *Attorney, Agent, or Firm* — Muncy, Geissler, Olds & Lowe, P.C.

(57) ABSTRACT

A conductive caster wheel is adapted to be mounted on a cart. The conductive caster wheel includes a caster hub adapted to be sleeved on a bearing of the cart, a wheel body sleeved on the caster hub, and a conductive plate disposed inside the caster hub and the wheel body. The conductive plate has an inner conductive section and an outer conductive section. The inner conductive section is exposed from an inner surrounding surface of the caster hub, and is adapted to be electrically connected to the bearing. The outer conductive section is electrically connected to the inner conductive section, is exposed from an outer surrounding surface of the wheel body, and is adapted to be in contact with a ground surface.

6 Claims, 4 Drawing Sheets

(56) References Cited

U.S. PATENT DOCUMENTS

| | | | | |
|---|---|---|---|---|
| 5,184,373 A | * | 2/1993 | Lange | B60B 33/025 |
| | | | | 16/35 R |
| 6,786,559 B1 | * | 9/2004 | Kidd | F16C 41/002 |
| | | | | 16/45 |
| 7,406,989 B1 | * | 8/2008 | Casaus | B60B 3/001 |
| | | | | 152/DIG. 2 |
| 7,889,478 B2 | * | 2/2011 | Yan | B60B 19/00 |
| | | | | 361/221 |
| 2010/0321938 A1 | * | 12/2010 | Hu | A63C 17/223 |
| | | | | 362/234 |
| 2013/0043716 A1 | * | 2/2013 | Chen | B60B 7/02 |
| | | | | 301/63.101 |

FOREIGN PATENT DOCUMENTS

| | | | |
|---|---|---|---|
| DE | 102015109532 A1 | * | 12/2016 |
| KR | 20130131744 A | * | 12/2013 |
| WO | WO-9807585 A1 | * | 2/1998 ............. B60B 33/00 |

\* cited by examiner

CONDUCTIVE CASTER WHEEL

CROSS-REFERENCE TO RELATED APPLICATION

This application claims priority to Taiwanese Invention Patent Application No. 109146702, filed on the 29 Dec. 2020.

FIELD

The disclosure relates to a wheel, and more particularly to a conductive caster wheel.

BACKGROUND

Static electricity may discharge and cause damage to electronic equipment, and is therefore a major concern for electronics manufacturing facilities. Workers at these facilities are required to wear electrostatic discharge (ESD) equipment such as anti-static ESD wrist straps while handling electronic components. This type of ESD wrist strap usually has a clip for connecting to a ground conductor and works by dispersing the static electricity on the worker to the ground. Additionally, the workers may use carts and trolleys to transport the manufactured electronic components within the facility, and the electronic components will need to be protected against ESD when being transported. Consequently, the carts used at the electronics manufacturing facilities are conventionally designed with a grounding line near the cart handle to mitigate ESD. However, this design is inconvenient for the workers, and the cart may not always be electrically grounded due to worker neglect or other factors, so that the electronic components transported by the cart may be damaged by electrostatic discharge.

SUMMARY

Therefore, an object of the disclosure is to provide a conductive caster wheel that can alleviate at least one of the drawbacks of the prior art.

According to the disclosure, a conductive caster wheel adapted to be mounted on a cart. The conductive caster wheel includes a caster hub adapted to be sleeved on a bearing of the cart, a wheel body sleeved on the caster hub, and a conductive plate disposed inside the caster hub and the wheel body. The conductive plate has an inner conductive section and an outer conductive section. The inner conductive section is exposed from an inner surrounding surface of the caster hub, and is adapted to be electrically connected to the bearing. The outer conductive section is electrically connected to the inner conductive section, is exposed from an outer surrounding surface of the wheel body, and is adapted to be in contact with a ground surface.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
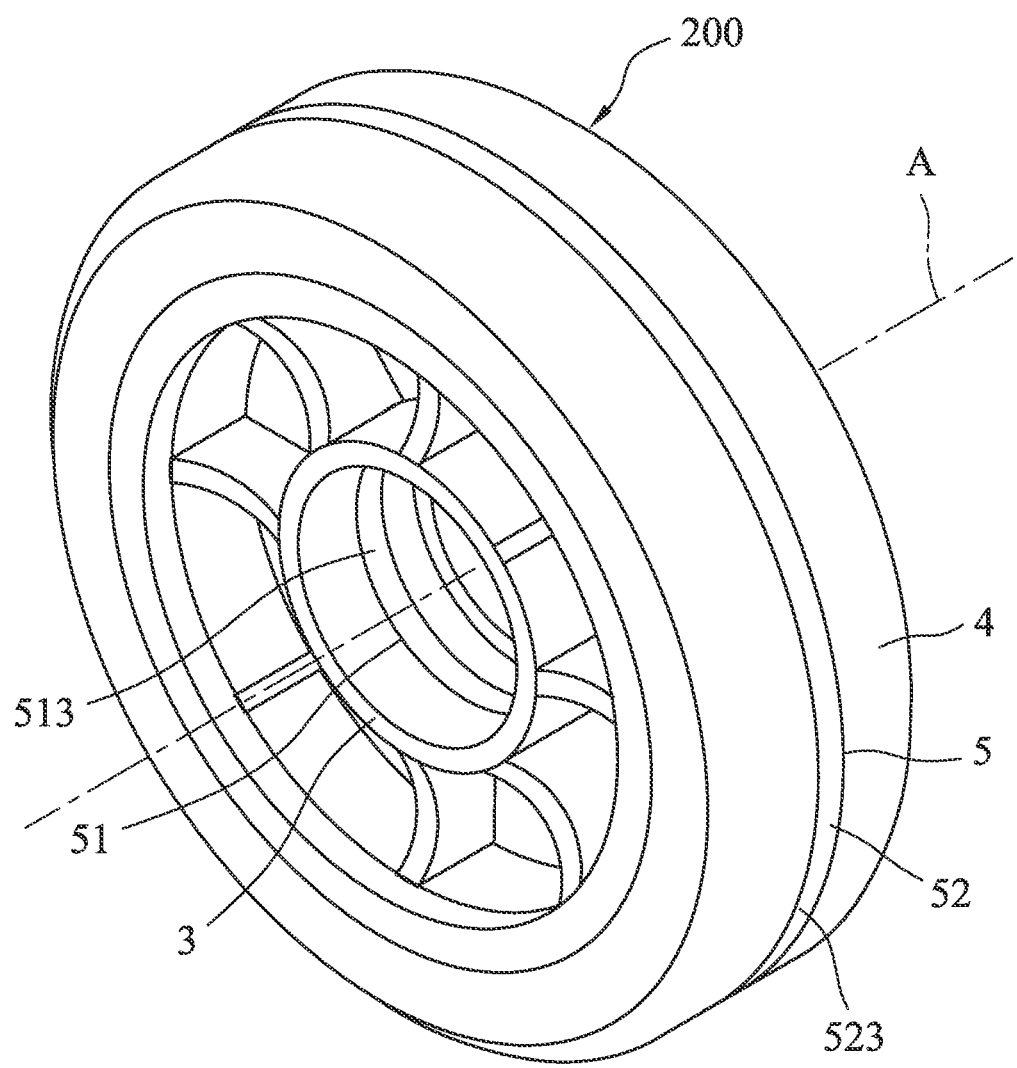
FIG. 1 is a perspective view illustrating an embodiment of a conductive caster wheel according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
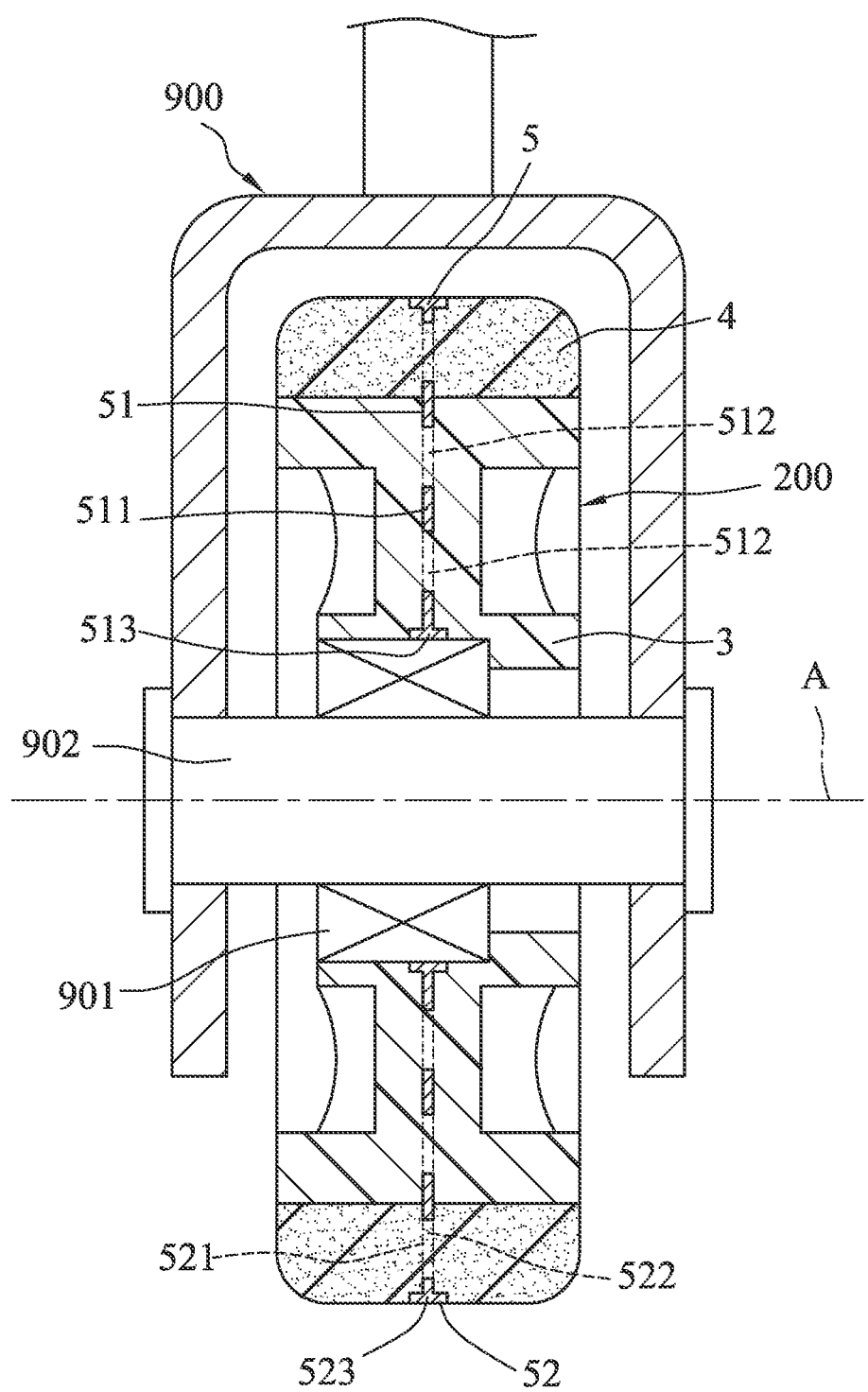
FIG. 2 is a fragmentary sectional view illustrating the embodiment mounted to a cart.
Figure 3:
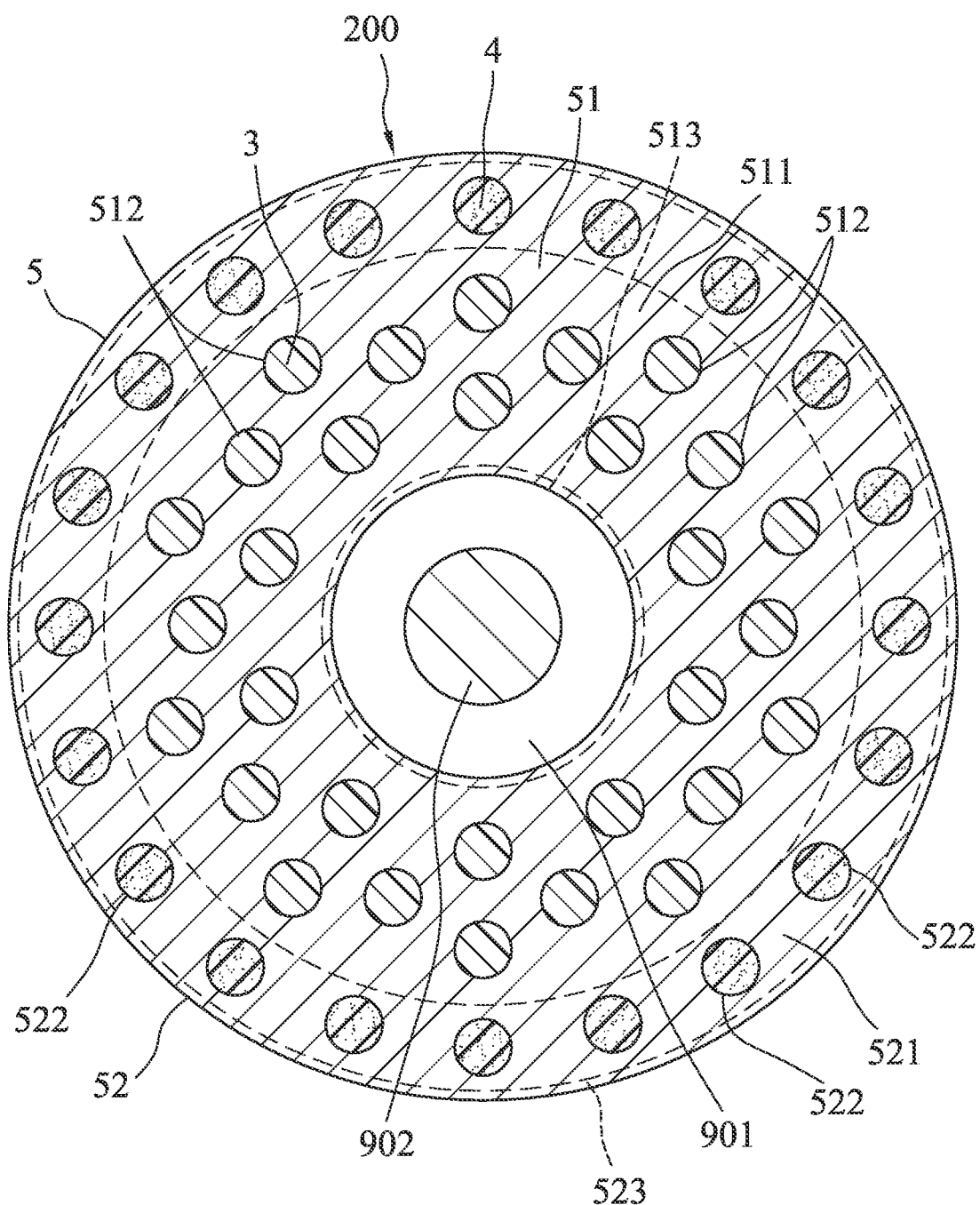
FIG. 3 is a sectional view illustrating the first embodiment.

Referring to FIGS. 1, 2 and 3, an embodiment of a conductive caster wheel 200 is shown. The conductive caster wheel 200 is adapted to be rotatably mounted on a metallic bearing 901 of a cart 900 so that the cart 900 can be electrically grounded. The conductive caster wheel 200 includes a caster hub 3 adapted to be sleeved on the bearing 901 of the cart 900, a wheel body 4 sleeved on the caster hub 3, and a conductive plate 5 disposed inside the caster hub 3 and the wheel body 4.

In this embodiment, the caster hub 3 is made of a plastic material and surrounds a central axis (A), and the wheel body 4 is made of a plastic material and is solid. The caster hub 3 and the wheel body 4 are made by molding and are molded as one piece. However, the method and material used to manufacture the caster hub 3 and the wheel body 4 is not limited to the above.

The conductive plate 5 is made of an electrically conductive metallic material, and is embedded inside the caster hub 3 and the wheel body 4. The conductive plate 5 has an inner conductive section 51 and an outer conductive section 52. The inner conductive section 51 is exposed from an inner surrounding surface of the caster hub 3, and is adapted to be electrically connected to the bearing 901. The outer conductive section 52 is electrically connected to the inner conductive section 51, is exposed from an outer surrounding surface of the wheel body 4, and is adapted to be in contact with the ground surface.

The inner conductive section 51 has an inner covered portion 511 that is embedded in the caster hub 3, and an inner ring portion 513 that is electrically and transversely connected to the inner covered portion 511, that extends along the central axis (A), that is exposed from the inner surrounding surface of the caster hub 3, and that is adapted to be electrically connected to the bearing 901. The inner covered portion 511 of the inner conductive section 51 has a plurality of through holes 512 that extend parallel to the central axis (A), and the through holes 512 are filled with a portion of the caster hub 3. The inner covered portion 511 of the inner conductive section 51 is ring-shaped and is co-axial with the caster hub 3, the ring portion 513 is connected to an inner end of the inner covered portion 511, the caster hub 3 is enclosing the inner ring portion 513, and the inner ring portion 513 is flush with the inner surrounding surface of the caster hub 3.

The outer conductive section 52 has an outer covered portion 521 that is embedded in the wheel body 4, and that is electrically connected to the inner conductive section 51. The outer conductive section 52 further has a peripheral rim portion 523 that is electrically and transversely connected to the outer covered portion 521, that extends along the central axis (A), and that is exposed from the outer surrounding surface of the wheel body 4, so that it may be in contact with the ground surface when the wheel body 4 rolls.

The outer covered portion 521 of the outer conductive section 52 is ring-shaped and is co-axial with the wheel body 4. The peripheral rim portion 523 is connected to an outer end of the outer covered portion 521. The outer covered portion 521 has a plurality of through holes 522 that extend parallel to the central axis (A), and the through holes 522 are filled with a portion of the wheel body 4.

When assembling the cart 900, the caster hub 3 is sleeved onto the bearing 901 so that the conductive section 51 of the conductive plate 5 is in contact with the bearing 901. The bearing 901 is then mounted on an axle 902 of the cart 900. The cart 900 may have a plurality of axles 902 corresponding to the amount of conductive caster wheels 200 that are to be mounted to the cart 900. The axles 902 of the cart 900 are made of a conductive metal material so that, when the conductive caster wheels 200 are mounted to the cart 900, the cart 900 is able to stay grounded.

When a worker in an electronics manufacturing facility employs the cart 900, he/she may clip his/her ESD wrist strap to any area on the cart 900 that is made from conductive metal and electrically connected to one of the conductive caster wheels 200, or he/she may handle the cart 900 directly with his/her hands touching any of the conductive metal parts of the cart and any static electricity on the worker and the cart 900 can be conducted to the ground and discharged.

Figure 4:
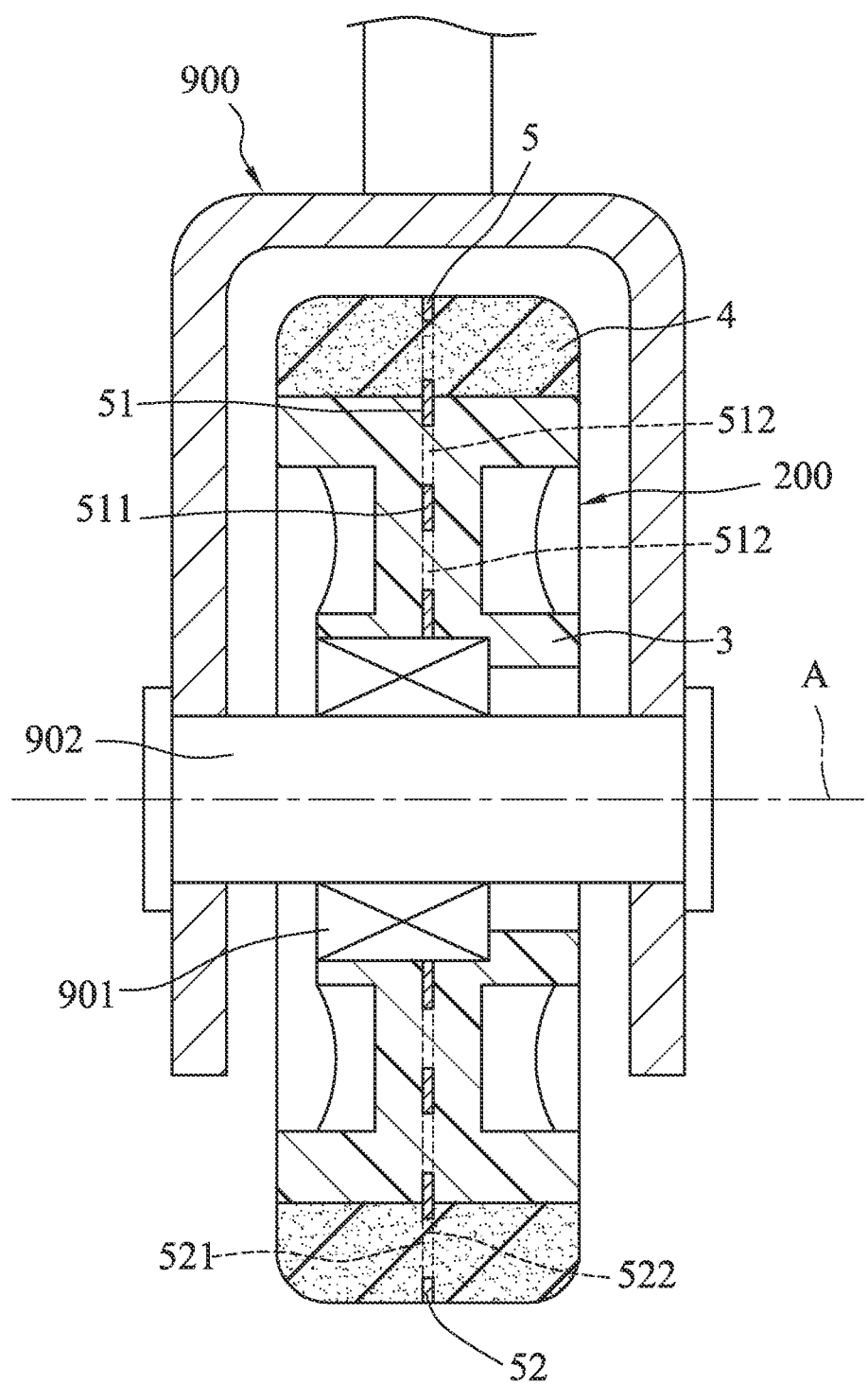
FIG. 4 is a fragmentary sectional view illustrating another embodiment of the conductive caster wheel according to the disclosure mounted to the cart.

Referring to FIG. 4, another embodiment of the conductive caster wheel 200 according to this disclosure is shown. In this embodiment, the inner ring portion 513 of the inner conductive section 51 and the peripheral rim portion 523 of the outer conductive section 52 of the conductive plate 5 are omitted. Instead, the inner end of the inner covered portion 511 is in direct contact with the bearing 901, and the outer end of the outer covered portion 521 is in direct contact with the ground surface. Furthermore, the materials used to manufacture the wheel body 4 and the conductive plate 5 may be carefully selected to have the same rate of wear, so that the conductive plate 5 and the wheel body 4 will be worn away by the ground surface at the same rate.

Additionally, in this embodiment, the through holes 512 and the through holes 522 of the conductive plate 5 are round. However, this is not a limitation this disclosure and the through holes 512, 522 may be other shapes.

In summary of the above, the conductive caster wheel 200 according to this disclosure is able to remain electrically grounded when the cart 900 is in use, by virtue of the conductive plate 5 being disposed inside the caster hub 3 and the wheel body 4. Therefore, the object of this disclosure is satisfied.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to one "embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection if with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A conductive caster wheel adapted to be mounted on a cart, said conductive caster wheel comprising:
   a caster hub adapted to be sleeved on a bearing of the cart;
   a wheel body sleeved on said caster hub; and
   a conductive plate disposed inside said caster hub and said wheel body, and having
      an inner conductive section that is exposed from an inner surrounding surface of said caster hub, and that is adapted to be electrically connected to the bearing, and
      an outer conductive section that is electrically connected to said inner conductive section, that is exposed from an outer surrounding surface of said wheel body, and that is adapted to be in contact with a ground surface;
   wherein said caster hub surrounds a central axis;
   wherein said inner conductive section has an inner covered portion that is embedded in said caster hub, and an inner ring portion that is electrically connected to said inner covered portion, that extends along the central axis, that has a thickness along the central axis larger than that of said inner covered portion, that is exposed from said inner surrounding surface of said caster hub, and that is adapted to be electrically connected to the bearing;
   wherein said inner covered portion of said inner conductive section is ring-shaped and is co-axial with said caster hub;
   wherein said inner ring portion is connected to an inner end of said inner covered portion;
   wherein said inner covered portion of said inner conductive section has a plurality of through holes that extend parallel to the central axis;
   wherein said through holes are filled with a portion of said caster hub; and
   wherein said outer conductive section has
   an outer covered portion that is embedded in said wheel body, and that is electrically connected to said inner conductive section, and
   a peripheral rim portion that is electrically connected to said outer covered portion, that extends along the central axis, that has a thickness along the central axis larger than that of said inner covered portion, and that is exposed from said outer surrounding surface of said wheel body.

2. The conductive caster wheel as claimed in claim 1, wherein:
   said outer covered portion of said outer conductive section is ring-shaped and is co-axial with said wheel body; and
   said peripheral rim portion is connected to an outer end of said outer covered portion.

3. The conductive caster wheel as claimed in claim 2, wherein:
   said outer covered portion has a plurality of through holes that extend parallel to the central axis; and
   said through holes are filled with a portion of said wheel body.

4. The conductive caster wheel as claimed in claim 1, wherein:
   said outer covered portion is electrically connected to said inner covered portion.

5. The conductive caster wheel as claimed in claim 4, wherein:
   said outer covered portion is ring-shaped and is co-axial with said wheel body; and
   said peripheral rim portion is connected to an outer end of said outer covered portion.

6. The conductive caster wheel as claimed in claim 5, wherein:
   said outer covered portion of said outer conductive section has a plurality of through holes that extend parallel to the central axis; and
   said through holes are filled with a portion of said wheel body.

* * * * *